United States Patent
Maros et al.

(10) Patent No.: US 10,007,778 B2
(45) Date of Patent: Jun. 26, 2018

(54) CONTROLLED CONNECTING METHOD BETWEEN LUMINAIRE AND AUXILIARY DEVICE

(71) Applicant: GENERAL ELECTRIC COMPANY, Schenectady, NY (US)

(72) Inventors: István Maros, BudaPest (HU); Roland Bátai, BudaPest (HU); Sándor Levente Szücs, BudaPest (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 342 days.

(21) Appl. No.: 14/852,512

(22) Filed: Sep. 12, 2015

(65) Prior Publication Data

US 2016/0312986 A1 Oct. 27, 2016

Related U.S. Application Data

(60) Provisional application No. 62/153,285, filed on Apr. 27, 2015.

(51) Int. Cl.
| | |
|---|---|
| *H05B 33/08* | (2006.01) |
| *H05B 37/02* | (2006.01) |
| *H05B 41/00* | (2006.01) |
| *G06F 21/44* | (2013.01) |
| *H01R 33/00* | (2006.01) |
| *H04L 29/06* | (2006.01) |

(52) U.S. Cl.
CPC ............ *G06F 21/44* (2013.01); *H01R 33/00* (2013.01); *H04L 63/00* (2013.01); *H05B 37/0245* (2013.01); *H05B 37/0254* (2013.01)

(58) Field of Classification Search
None
See application file for complete search history.

(56) References Cited

U.S. PATENT DOCUMENTS

2010/0020550 A1* 1/2010 Kawashima ........ F21V 23/0435
362/362

OTHER PUBLICATIONS

Maros et al., "Controlled Connecting Method Between Luminaire and Auxiliary Device", GE co-pending U.S. Appl. No. 14/809,182, filed Jul. 25, 2015.

* cited by examiner

*Primary Examiner* — Dedei K Hammond
(74) *Attorney, Agent, or Firm* — Peter T. DiMauro; GE Global Patent Operation

(57) ABSTRACT

According to some embodiments, a system and method provide a lighting fixture including at least one socket, wherein each socket is operative to receive an auxiliary device; and a fixture authentication module operative to authenticate each received auxiliary device. Numerous other aspects are provided.

18 Claims, 4 Drawing Sheets

CONTROLLED CONNECTING METHOD BETWEEN LUMINAIRE AND AUXILIARY DEVICE

RELATED APPLICATION

The present application claims priority to U.S. Provisional Patent Application Ser. No. 62/153,285, filed Apr. 27, 2015, and entitled "CONTROLLED CONNECTING METHOD BETWEEN LUMINAIRE AND AUXILIARY DEVICE," which is hereby incorporated herein by reference in its entirety for all purposes.

FIELD

Embodiments of the present invention generally relate to light sources.

BACKGROUND

A lighting fixture (also known as a luminaire) may provide for an external device to be mounted thereto. However, the external device may be at least one of: incompatible with the lighting fixture, negatively affect the performance of the lighting fixture, create warranty-affecting issues for the lighting fixture manufacturer, and provide an unsafe environment.

Accordingly, the present inventors have recognized that a need exists for an improved, dependable controlled connection between a lighting fixture and an external device.

SUMMARY

In one embodiment, a lighting fixture includes at least one socket, wherein each socket is operative to receive an auxiliary device; and a fixture authentication module operative to authenticate each received auxiliary device.

In another embodiment a method includes receiving an auxiliary device in a socket of a lighting fixture; recognizing the received auxiliary device; authenticating the auxiliary device, via a fixture authentication module, at the lighting fixture; and providing at least one of power and data connectivity to the auxiliary device from the lighting fixture.

BRIEF DESCRIPTION OF THE DRAWINGS

Aspects and/or features of the invention and many of their attendant benefits and/or advantages will become more readily apparent and appreciated by reference to the detailed description when taken in conjunction with the accompanying drawings, which drawings may not be drawn to scale.

DETAILED DESCRIPTION

Figure 1:
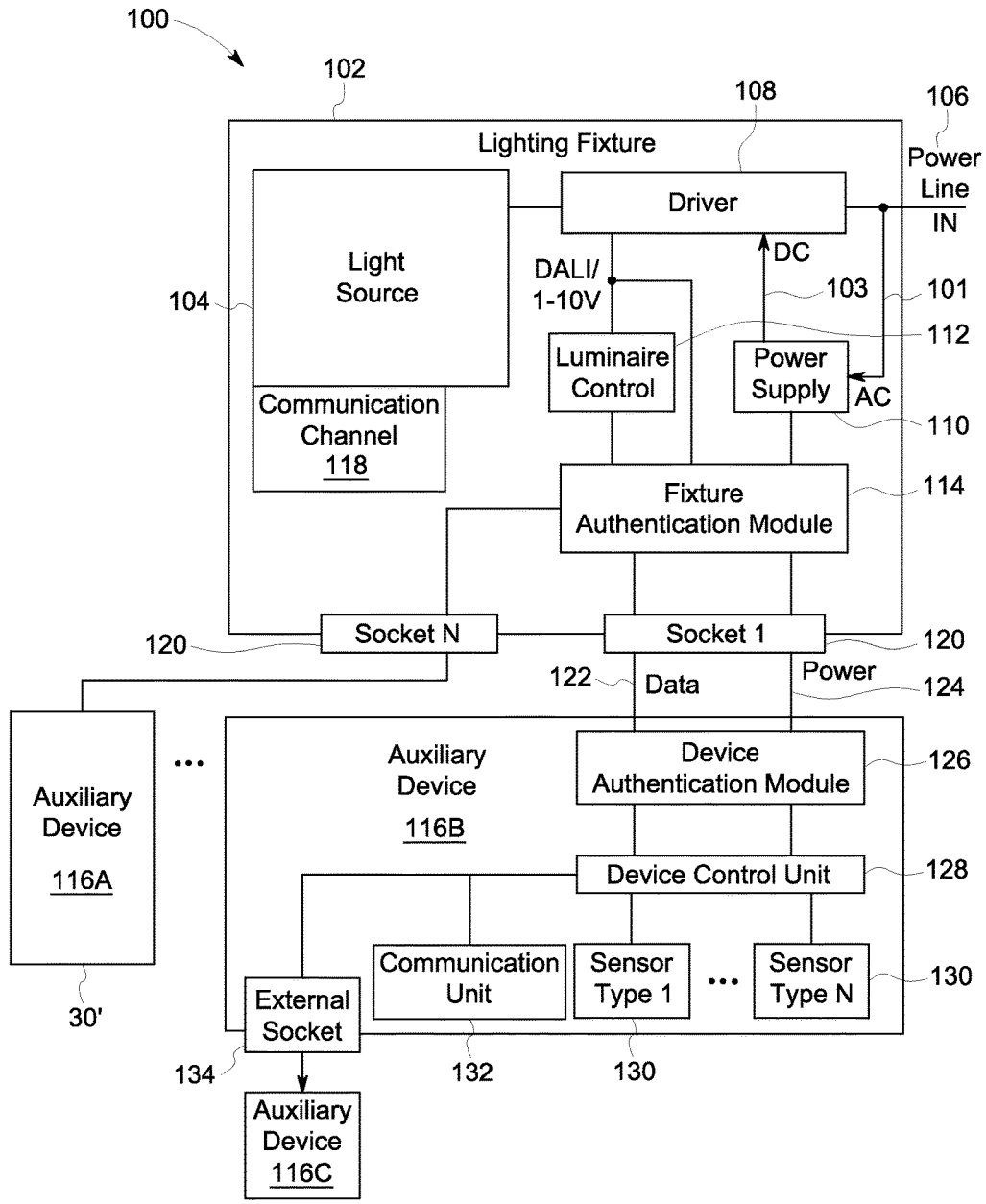
FIG. 1 illustrates a block diagram of a system, according to some embodiments.

Some embodiments may include a lighting fixture that may be selectively coupled with an external device (e.g., auxiliary device), whereby the lighting fixture may provide at least one of power and data communication to the external device in a controlled manner via an authentication module.

In one or more embodiments, the authentication module may include at least two cooperating, but distinct, parts. One part may be integrated into the lighting fixture (e.g., fixture authentication module), while the other part (e.g., device authentication module) may be integrated into the auxiliary device. In one or more embodiments the authentication ("handshaking") process may include any suitable authentication process employed in, for example, the information technology field. As used herein, "authentication module" may refer to any of the cooperating parts, or the cooperating parts together acting as a whole module.

A technical effect of some embodiments is that the lighting fixture manufacturer may control the quality of third-party-manufactured auxiliary devices that connect to the "intelligent" lighting fixture. The lighting fixture manufacturer may desire to control the quality of connected auxiliary devices to maintain the standards, quality and warranty conditions provided by the lighting fixture manufacturer. In one or more embodiments, control of the auxiliary device may be via the authentication module. In particular, if the auxiliary device is not authenticated by the authentication module, the auxiliary device may receive either limited or no functionality, power and/or data communication via the lighting fixture. Another technical effect of some embodiments is that power and data may be relatively safely supplied to the auxiliary devices via the lighting fixture. Another technical effect of some embodiments is that cyber security and safety of a lighting communication network may be increased via the authentication module. Another technical effect of some embodiments is that a variety of auxiliary devices may obtain power and data communication in public areas where the disclosed lighting fixtures may exist.

Another technical effect of one or more embodiments is the provision of a service whereby a first entity (e.g., a lighting fixture manufacturer, or a lighting fixture supplier, or a lighting fixture owner, such as a municipality) controls the use of the authentication module in the lighting fixture. The first entity may charge a fee to a second entity (e.g., users or providers of an auxiliary device), if the latter uses the capabilities (e.g., power and data connectivity) of the lighting fixture. The first entity may limit the capabilities of the services provided to the auxiliary device if the second entity does not pay a specified service fee.

As used herein, the "intelligent lighting fixture" refers to a lighting fixture that is an intelligent electronic device that, for example, performs electrical measurements or lighting level control functions, has the ability to monitor processes, and may communicate over a variety of communication channels. As used herein, the terms "lighting fixture" and "luminaire," as well as related terms may refer to any light unit and all the components directly associated with the distribution, positioning and protection of the light unit, and may be used interchangeably. As used herein, the terms "external device" and "auxiliary device," as well as related terms, may be used interchangeably, and may refer to any device that may be connected (e.g., electrically) to the lighting fixture. An auxiliary device may include, for example, hand-phones, smartphones, cellphones, USB or similar devices, lighting control modules, communication modules and sensors. Other suitable auxiliary devices may be used.

One or more embodiments of the invention or elements thereof can be implemented in the form of a computer program product including a computer readable storage medium with computer usable program code for performing the method steps indicated. Furthermore, one or more embodiments of the invention or elements thereof may be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Turning to FIG. 1, an example system 100 is provided. The system 100 may include a lighting fixture 102. The lighting fixture 102 may include a housing to house a light source 104 and associated optical hardware (not shown). In one or more embodiments, the light source 104 may be an LED-based light source, HPS, CMH, Fluorescent, Halogen, or any other suitable light source.

The lighting fixture 102 may include a power line-in 106 to receive power from a power source (not shown), and supply the power to a driver 108. The light source 104 may be in operative electrical communication with the driver 108 to receive power therefrom. In one or more embodiments, the driver 108 may receive power (e.g., DC power) directly from the power source via the power line-in 106. In some embodiments, the lighting fixture 102 may include a power supply 110 to convert AC power provided by the power source to DC power to supply to the driver 108, as indicated by directional arrows 101 and 103.

The lighting fixture 102 may house a luminaire control unit 112 operative to control the luminance emitted by the light source 104. In one or more embodiments, an auxiliary device 116a-c, as described further below, may, in addition to, or instead of, the luminaire control unit 112, control the luminance emitted by the light source 104. In one or more embodiments, the luminaire control unit 112 may be in operative communication with the driver 108 by a DALI/1-10 V interface. Other suitable interfaces may be used (e.g. a serial RS485 communication via UART or analog PWM, etc.).

Figure 2:
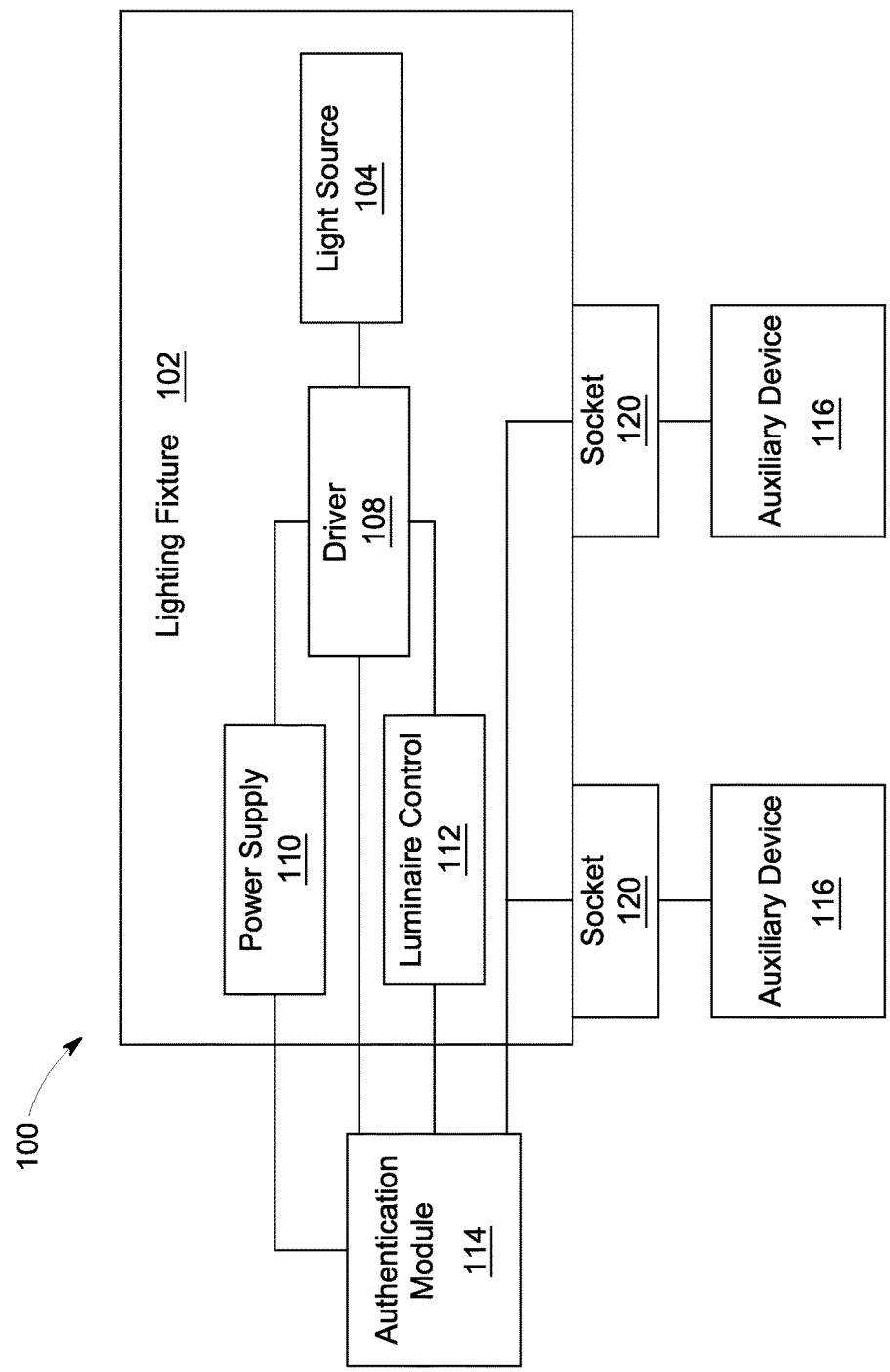
FIG. 2 illustrates a block diagram of a system, according to some embodiments.

The system 100 may include a fixture authentication module 114. The fixture authentication module 114 may include at least one of hardware and software to authenticate at least one auxiliary device 116a-c, as will be further described below. In one or more embodiments, the fixture authentication module 114 may be at least one of contained within or associated with the lighting fixture 102. In one or more embodiments, the fixture authentication module 114 may be supplied by the manufacturer of the lighting fixture 102, and be manufactured as part of the lighting fixture 102. In one or more embodiments, the fixture authentication module 114 may be a stand-alone hardware module (e.g., FIG. 2) that may be electrically associated (e.g., via a retro-fitting procedure) to an existing lighting fixture to effectively become integrated with the lighting fixture. Of note, a lighting fixture manufacturer may provide a stand-alone fixture authentication module 114 to a third-party (e.g., certified third-party company), such that the third-party may build an auxiliary device 116 compatible with the lighting fixture.

In one or more embodiments, the lighting fixture 102 may include an external communication channel 118 (e.g., Wired such as RS485, Ethernet, USB etc, or wireless such as NFC, WiFi, Cellular, RF, Bluetooth™ etc.) that may provide a communication and/or power platform for the auxiliary device(s) 116a-c. In one or more embodiments, the auxiliary device 116a-c may access the communication channel 118 after the auxiliary device 116a-c has been authenticated via the fixture authentication module 114, as further described below.

The lighting fixture 102 may include one or more sockets 120, each of which is operative to mechanically and electrically receive the auxiliary device 116a-c. In one or more embodiments, the fixture authentication module 114 may be in digital (e.g., data) communication 122 and electrical communication 124 with the one or more sockets 120.

Each auxiliary device 116a-c may selectively receive power and data across an interface (not shown) when received in the socket 120. The power and data may be transmitted in any operable manner. For example, the power and data may be transmitted by the fixture authentication module if a luminaire control auxiliary device is connected which needs power and communication. It can be a case when only power needed for example if a sensor data logger connected as auxiliary device only gathers data no effects to light source control or it can use only communication connection when the auxiliary device has built-in power supply e.g. battery). Other suitable transmission manners may be used. In one or more embodiments, each auxiliary device 116a-c may include a device authentication module 126. The device authentication module 126 may be operative to receive power and data across the interface from the lighting fixture 102. In one or more embodiments, the device authentication module 126 may include at least one of hardware and software. In one or more embodiments, the device authentication module 126 may include a digital certificate which may allow the fixture authentication module 114 to authenticate the auxiliary device 116a-c.

Each auxiliary device 116a-c may include one or more device control units 128, one or more sensors 130, and a communication unit 132 or it may contains individual power supply e.g. battery or super capacitor (not shown). In one or more embodiments, the device authentication module 126 may be in electrical and digital communication with the device control unit 128. In one or more embodiments, the device control unit 128 may communicate with the one or more sensors 130 for receipt of sensory data. The sensors 130 may detect the same type of information, or may detect different types of information (e.g., all of the sensors may detect occupancy of an area, or some sensors may detect occupancy while others detect temperature). Information or sensory data detected by the sensors 130 may be routed through the device control unit 128 for transmission to a remote receiver (not shown) via the communication unit 132, for example. The communication unit 132 may be wired or wireless, and may provide one-way or two-way communication. In some embodiments, the data acquired by the sensors 30 may be routed to the lighting fixture 102, after authentication. For example, if the auxiliary device 116a-c is a camera, the auxiliary device 116a-c may include an occupancy/motion sensor 130 to detect occupants in an environment. By coupling the auxiliary device camera 116a-c to the light fixture 102, the auxiliary device 116a-c may act as a security system. In particular, the auxiliary device 116a-c may be connected to the lighting fixture 102 and a controlled connection processing platform 400 (FIG. 4) associated therewith, provided authentication occurs, whereby the combined lighting fixture 102 and auxiliary device 116a-c functions as a security system without the need for installing a more conventional and complex security system that includes separate cameras and motion sensors that provide information to a separate security system platform for storage and analysis. Another example is if the auxiliary device contains a light level sensor and send toward this data to the luminaire control device which can control the lighting output based on the light sensor value. As further described below, multiple auxiliary devices 116a-c coupled to the lighting fixture 102 may be in communication with each other via the controlled connection processing platform 400. In keeping with the security system, for example, the camera may be one auxiliary device 116a and a USB flash drive may be another auxiliary device 116b coupled to the lighting fixture 102. The information recorded by the camera may be stored in a memory of the USB flash drive.

In one or more embodiments, each auxiliary device 116a-c may include one or more auxiliary device sockets 134. The one or more auxiliary device sockets 134 may receive another auxiliary device (e.g., 116c), such that the auxiliary devices are serially connected to the lighting fixture 102. In one or more embodiments, each auxiliary device 116, whether connected directly to the lighting fixture 102, or connected serially to the lighting fixture via another auxiliary device is subject to authentication via the fixture authentication module 114 prior to the auxiliary device 116 receiving at least one of full, limited or no functionality, power and/or data communication via the lighting fixture.

In one or more embodiments, the fixture authentication module 114 may serve multiple and different auxiliary devices serially and/or simultaneously or substantially simultaneously. For example, as shown in FIG. 1, auxiliary devices 116a and 116b are each directly connected to the fixture authentication module 114, and may be served simultaneously or substantially simultaneously, while auxiliary device 116c is connected serially to the fixture authentication module 114 via auxiliary device 116b. In one or more embodiments, when an auxiliary device 116c is connected serially, the serial auxiliary device 116c is ultimately authenticated by the fixture authentication module 114. In one or more embodiments, the serially connected auxiliary device 116c may be authenticated by each device authentication module in the chain of serially connected auxiliary devices prior to authentication by the fixture authentication module 114.

Figure 3:
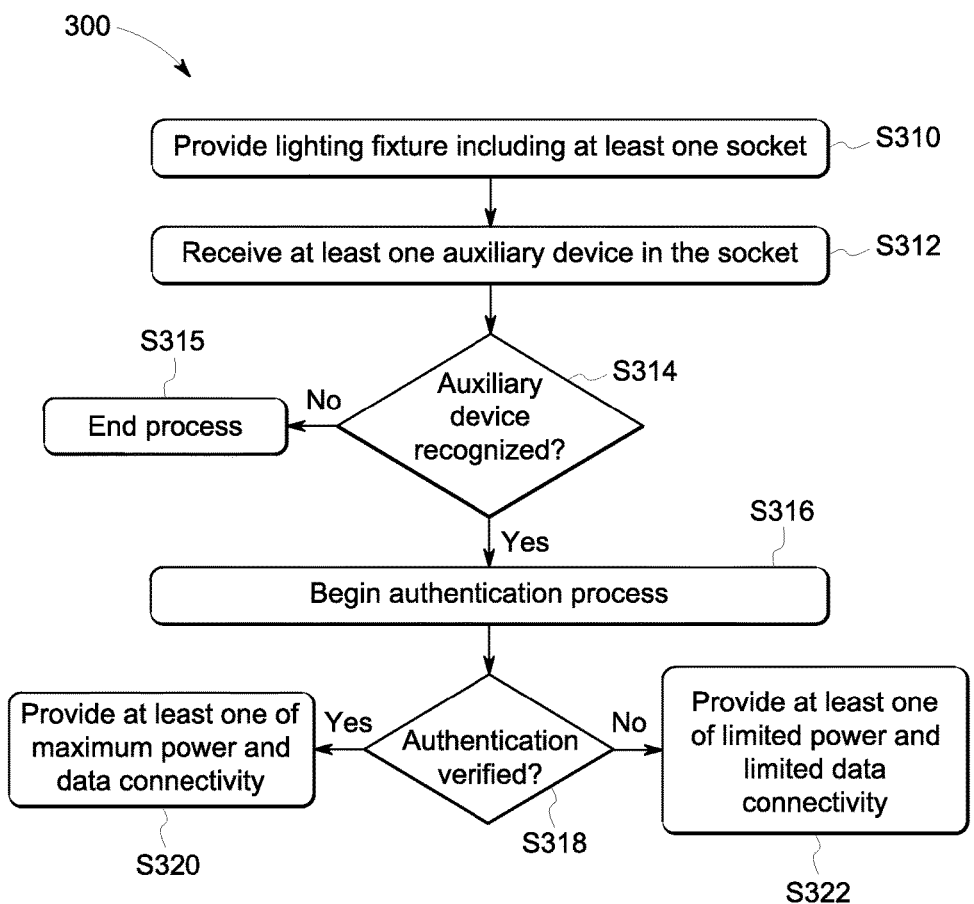
FIG. 3 illustrates a flow diagram of a process according to some embodiments.

Turning to FIG. 3, an example of operation according to some embodiments is provided. In particular, FIG. 3 is a flow diagram of a process 300 according to some embodiments. Process 300 and other processes described herein may be performed using any suitable combination of hardware (e.g., circuit(s)), software or manual means. In one or more embodiments, a system 100 (FIG. 1) is conditioned to perform the process 300, such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto.

Initially at S310, a lighting fixture 102 including at least one socket 120 is provided, where each socket 120 is operative to receive an auxiliary device 116. Then at S312, at least one auxiliary device 116 is received in the socket 120 of the lighting fixture 102. As described above, at least one of power and data may be transferred from the lighting fixture 102 to the auxiliary device 106, and vice versa, through the socket 120. Then in S314, it is determined whether the lighting fixture 102 recognizes the auxiliary device 116. In one or more embodiments, the auxiliary device 116 may transmit a code to the lighting fixture 102 to facilitate the recognition. If the auxiliary device connected wirelessly (e.g. via air core transformator, or wireless communication) then the auxiliary device shall transform the right key to authentication via the established limited communication, if the key is approved then the auxiliary device will get the full access. Another example to recognize the auxiliary device is when the auxiliary device has a special mechanical body which pushes or activates a switch if placed into the socket, the switch on signal tells the fixture to the socket is contains auxiliary device. Other possible solutions is if the auxiliary device has a magnet in a certain point and the fixture consists a magnetic sensor which sense if the auxiliary device is in the slot or socket. If at S314 the lighting fixture 102 does not recognize the auxiliary device 116a-c, the process 300 ends at S315. If at S314 the lighting fixture 102 recognizes the auxiliary device 116, the authentication ("handshake") process begins in S316. In one or more embodiments, the lighting fixture 102 may provide limited (e.g., less than maximum) or no power and/or limited data connectivity (e.g. less speed or limited protocol functionalities) to the auxiliary device 116 after receipt in the socket 120 and prior to the authentication process. In one or more embodiments, if nothing is received in the socket 120, no power is provided to the socket 120 to avoid an unwanted loss of power. The authentication process may be conducted by the fixture authentication module 114 and the device authentication module 126. In one or more embodiments, the authentication process may be initiated by either the fixture authentication module 114 or the device authentication module 126. In one or more embodiments, the authentication process is performed by establishing the pairing of the fixture authentication module 114 with the device authentication module 126 over a communication medium, and the fixture authentication module 114 subsequently verifying the authenticity of details received at the fixture authentication module 114. In one or more embodiments, the fixture authentication module 114 receives a handshake code/key from the device authentication module 126, and compares the received handshake code/key to a stored list of authorized codes. Any other suitable authentication process may be used. The fixture authentication module 114 determines whether the auxiliary device is authenticated at S318. If the handshake code provided by the device authentication module 126 matches a code stored in the fixture authentication module 114, the device authentication module 126 is verified in S318, and at least one of maximum power and full data communication (e.g., bandwidth, latency, enable driver control features) are provided to the auxiliary device 116 in S320 via data line 122 and power line 124, for example. If the handshake code provided by the device authentication module 126 does not match a code stored in the fixture authentication module 114, or the authentication process fails for another reason (e.g., connection failover happen or power failover happen) at S318, the lighting fixture 102 may continue to provide at least one of limited (e.g., less than maximum) or no power and limited or no data connectivity to the auxiliary device 116 in S322 and keep this state until a certain refreshing time over and restart the authentication process or while the device disconnected from the socket and reconnect any device. In one or more embodiments, the authentication process may be attempted for at least one of a specified number of times or a specified time duration before a determination is made that the authentication is not verified in S318.

Figure 4:
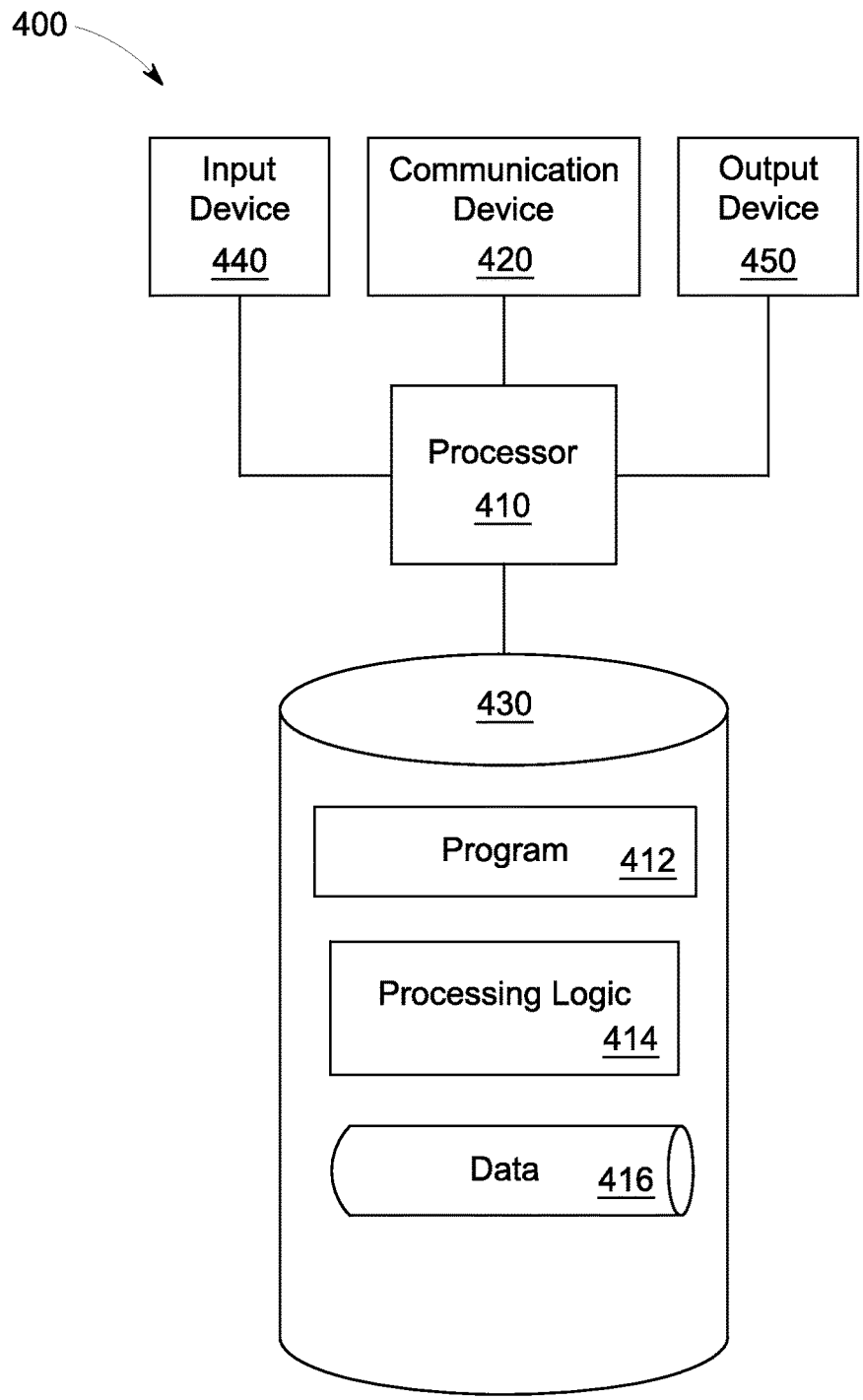
FIG. 4 illustrates a block diagram of a system according to some embodiments.

Note the embodiments described herein may be implemented using any number of different hardware configurations. For example, FIG. 4 illustrates a controlled connection processing platform 400 that may be, for example, associated with the system 100 of FIG. 1. The controlled connection processing platform 400 comprises a controlled connection platform processor 410, such as one or more commercially available Central Processing Units (CPUs) in the form of one-chip microprocessors, coupled to a communication device 420 configured to communicate via a communication network (not shown in FIG. 4). The communication device 420 may be used to communicate, for example, with one or more users. The controlled connection processing platform 400 may further include an input device 440 (e.g., a mouse and/or keyboard to enter information about variables, clustering and optimization) and an output device 450 (e.g., to output and display the selected samples).

The processor 410 also communicates with a storage device 430. The storage device 430 may comprise any appropriate information storage device, including combinations of magnetic storage devices (e.g., a hard disk drive), optical storage devices, mobile telephones, and/or semiconductor memory devices. The storage device 430 may store a program 412 and/or controlled connection processing logic 414 for controlling the processor 510. The processor 410 performs instructions of the programs 412, 414, and thereby operates in accordance with any of the embodiments described herein. For example, the processor 410 may receive a code to recognize an auxiliary device and then receive a handshake code and then may apply the fixture authentication module 114 via the instructions of the programs 412, 414 to determine the authenticity of the auxiliary device. The storage device 430 may also store data 416 (e.g., authentication recognition and/or handshake codes) in a database, for example.

The programs 412, 414 may be stored in a compressed, uncompiled and/or encrypted format. The programs 412, 414 may furthermore include other program elements, such as an operating system, a database management system, and/or device drivers used by the processor 410 to interface with peripheral devices.

As used herein, information may be "received" by, or "transmitted" to, for example: (i) the platform 400 from another device; or (ii) a software application or module within the platform 400 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a fixture authentication module and a device authentication module. The method steps can then be carried out using the distinct software modules and/or sub-modules of the system, as described above, executing on one or more hardware processors 410 (FIG. 4). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A lighting fixture comprising:
   at least one socket, wherein the at least one socket is operative to receive an auxiliary device; and
   a fixture authentication module operative to authenticate the received auxiliary device;
   wherein the lighting fixture provides at least one of maximum power and maximum data connectivity to the auxiliary device received in the socket, after the auxiliary device is authenticated by the fixture authentication module.

2. The lighting fixture of claim 1, wherein operation of the auxiliary device is based on authentication by the fixture authentication module.

3. The lighting fixture of claim 1, wherein the auxiliary device is one of a lighting control module, a communication module, and a sensor.

4. The lighting fixture of claim 3, wherein the sensor is one of a radar sensor, a microwave sensor, a microphone, an occupancy sensor, a video sensor, a humidity sensor, a light sensor, an accelerometer, a gas sensor, and a thermometer.

5. The lighting fixture of claim 1, wherein connectivity between the lighting fixture and the auxiliary device is at least one of hardwired or wireless.

6. The lighting fixture of claim 1, wherein a luminance level of the lighting fixture is selectively adjusted via the auxiliary device.

7. The lighting fixture of claim 1, further comprising:
a communication channel, wherein the communication channel is accessed by the auxiliary device after the fixture authentication module authenticates the auxiliary device.

8. The lighting fixture of claim 1, wherein two or more auxiliary devices are connected to the lighting fixture.

9. The lighting fixture of claim 8, wherein at least one of the auxiliary devices is connected serially to the lighting fixture.

10. A lighting fixture comprising:
at least one socket, wherein the at least one socket is operative to receive an auxiliary device; and
a fixture authentication module operative to authenticate the received auxiliary device;
wherein the lighting fixture provides at least one of less than maximum power and less than maximum data connectivity to the auxiliary device received in the socket, prior to authentication by the fixture authentication module.

11. A lighting fixture comprising:
at least one socket, wherein the at least one socket is operative to receive an auxiliary device; and
a fixture authentication module operative to authenticate the received auxiliary device;
wherein the lighting fixture is operative to provide bi-directional communication to the auxiliary device.

12. A lighting fixture comprising:
at least one socket, wherein the at least one socket is operative to receive an auxiliary device; and
a fixture authentication module operative to authenticate the received auxiliary device;
wherein the auxiliary device includes a device authentication module.

13. The lighting fixture of claim 12, wherein the fixture authentication module device is operative to communicate with the device authentication module to authenticate the auxiliary device.

14. A method comprising:
receiving an auxiliary device in a socket of a lighting fixture;
recognizing the received auxiliary device;
authenticating the auxiliary device, via a fixture authentication module, at the lighting fixture; and
providing at least one of power and data connectivity to the auxiliary device from the lighting fixture;
wherein the method further comprises providing at least one of maximum power and maximum data connectivity to the auxiliary device received in the socket, after the auxiliary device is authenticated.

15. The method of claim 14, further comprising:
providing less than at least one of maximum power and maximum data connectivity to the auxiliary device received in the socket, before the auxiliary device is authenticated.

16. The method of claim 14, further comprising:
providing, via the lighting fixture, bi-directional communication to the auxiliary device.

17. The method of claim 14, further comprising:
selectively adjusting a luminance level of the lighting fixture with the authenticated auxiliary device.

18. The method of claim 14, further comprising:
accessing, with the auxiliary device, a communication channel of the lighting fixture after the auxiliary device is authenticated by the fixture authentication module.

* * * * *